(12) United States Patent
Thuillier et al.

(10) Patent No.: US 10,565,755 B2
(45) Date of Patent: Feb. 18, 2020

(54) METHOD OF DISPLAYING IMAGES

(71) Applicant: Safran Identity and Security, Issy-les-Moulineaux (FR)

(72) Inventors: Cedric Thuillier, Issy-les-Moulineaux (FR); Laurent Kazdaghli, Issy-les-Moulineaux (FR); Sebastien Bronsart, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 124 days.

(21) Appl. No.: 15/310,080

(22) PCT Filed: Mar. 19, 2015

(86) PCT No.: PCT/FR2015/050683
§ 371 (c)(1),
(2) Date: Nov. 9, 2016

(87) PCT Pub. No.: WO2015/173482
PCT Pub. Date: Nov. 19, 2015

(65) Prior Publication Data
US 2017/0140565 A1    May 18, 2017

(30) Foreign Application Priority Data
May 12, 2014    (FR) ...................................... 14 54217

(51) Int. Cl.
*G06T 11/60*    (2006.01)
*G09G 5/14*    (2006.01)
(Continued)

(52) U.S. Cl.
CPC .......... *G06T 11/60* (2013.01); *G06K 9/00067* (2013.01); *G06T 11/206* (2013.01);
(Continued)

(58) Field of Classification Search
CPC ........ G06F 3/0482; G06F 17/24; G06F 17/50; G06T 11/001; G06T 2200/24; G06T 2207/20092; H04B 3/14
See application file for complete search history.

(56) References Cited

U.S. PATENT DOCUMENTS

2012/0154442 A1* 6/2012 Takaoka ............. H04N 5/23216
345/634
2017/0205971 A1* 7/2017 Himberger ............ G06F 3/0482

OTHER PUBLICATIONS

DXO Image Scuebce, DxO FilmPack 4 User Guide, copyright 1999-2013, p. 1-43 (Year: 2013).*
(Continued)

*Primary Examiner* — Samantha (Yuehan) Wang
(74) *Attorney, Agent, or Firm* — Womble Bond Dickinson (US) LLP

(57) ABSTRACT

The present invention relates to a method of displaying images implemented by a data processing module able to be connected to a display system comprising at least two display zones (ZA1, ZA2), said method of displaying images comprising the following steps: —displaying of a first image (11) in a first display zone (ZA1) of said display system, —displaying of at least one second image (12) obtained by applying to the first image (11) at least one image processing algorithm, each second image (12) being displayed in a second zone (ZA2) of said display system, —as long as one of said second zones (ZA2) displaying one of said second images (12) is hovered over by a pointer, displaying, in all or part of the first display zone (ZA1), of at least one part of said first image to which is applied the at least one processing algorithm making it possible to obtain said second hovered-over image (12).

12 Claims, 5 Drawing Sheets

(51) Int. Cl.
*G06K 9/00* (2006.01)
*G06T 11/20* (2006.01)
*G06F 3/0484* (2013.01)

(52) U.S. Cl.
CPC .......... *G09G 5/14* (2013.01); *G06F 3/04842* (2013.01); *G06F 2203/04806* (2013.01); *G06T 2200/24* (2013.01); *G09G 2340/045* (2013.01); *G09G 2340/0464* (2013.01); *G09G 2354/00* (2013.01)

(56) References Cited

OTHER PUBLICATIONS

Search Report and Written Opinion in French Application No. 1454217 dated Jan. 30, 2015, with English translation coversheet. 12 pages.

Search Report and Written Opinion in PCT/FR2015/050683 dated Jun. 22, 2015, with English translation. 27 pages.

"Dx0 FilmPack 4 User Guide" (Jan. 1, 2013), pp. 1-43. Retrieved from the Internet: URL:support.dxo.com/attachments/token/wgli1b6xhcxptns/?name=Dx0_FilmPack_4.5_User_Guide_Win_Mac.pdf (retrieved on Jan. 15, 2015).

Unique Photo YouTube: "Dx0 FilmPack 4 Demonstration" (Nov. 12, 2013). Retrieved from the Internet: URL:https://www.youtube.com/watch?v=xbVCnaktSBU (retrieved on Jan. 22, 2015). Minutes 1:30-2:30.

Chimpytech: "Word 2010 Live Preview Explained" (Oct. 21, 2012), retrieved from the Internet: URL:http//www.chimpytech.com/word-2010-live-preview-explained/ (retrieved on Jan. 15, 2015).

Chen et al. "Nonlinear Revision Control for Images." AMC SIGGRAPH, 2011 Papers on, SIGGRAPH '11 (Jan. 1, 2011), p. 1.

Edwards et al. "Timewarp." Proceedings of the SIGCHI Conference on Human Factors in Computing Systems, CHI '97 (Jan. 1, 1997).

* cited by examiner

METHOD OF DISPLAYING IMAGES

GENERAL TECHNICAL FIELD

The invention relates to the field of the image processing, and more precisely a method of displaying image for selection and application to an image of a plurality of processing events.

PRIOR ART

In the field of biometry many methods use shape or image recognition algorithms, for example to recognize a fingerprint or a face in an image. The images fed into such recognition algorithms often exhibit no optimal quality. It is therefore often necessary to provide the use of series of image-processing events so as to modify the processed image to improve the precision of the recognition of a print or face in this image. The processing to be applied can vary from one series of images to another, for example as a function of the image-taking conditions. It is therefore necessary to select for each image or series of images one or more adapted processing events.

The majority of tools existing for selection and application of such processing events proposes different predefined processing algorithms to a user. The user can apply one of these processing events to an image and if this processing appears unsuitable to him the user can cancel this processing and select another. For this to happen, the user generally must take an action to select processing to be applied, a second action to cancel application of this processing, then a third action to select new processing etc. . . .

By way of example, if he wants to modify the image illustrated in FIG. 1, the user can use a static list, such as illustrated in FIG. 2 to select a processing. The application of this processing to the image illustrated in FIG. 1 produces display of the image illustrated in FIG. 3. If the result is unsuitable for him, the user can cancel application of the processing. The image illustrated in FIG. 1 is displayed again and the user can select a new processing by means of the list illustrated in FIG. 2, producing the display of the image illustrated in FIG. 4.

Such solutions need a big number of operations on the part of the user to compare several processing events to each other and select processing adapted among the many processing events proposed.

Also, such solutions are poorly adapted to selection of a combination of several processing algorithms to be applied jointly to the same image. They actually need the user to have good knowledge of the processing events proposed and a multitude of operations to select the different processing events to be applied one by one, and this for each image.

There is therefore a need for a method of displaying images letting a user easily compare several possible processing events, select one or more processing events to be applied at a reduced number of operations and apply a series of selected processing events to one or more images to be processed.

PRESENTATION OF THE INVENTION

According to a first aspect the present invention relates to a method of displaying images executed by a data-processing module capable of being connected to a display system comprising at least two display areas, said method of displaying images comprising the following steps:

displaying a first image in a first display area of said display system, displaying at least one second image obtained by application to the first image of at least one image-processing algorithm, each second image being displayed in a second area of said display system, said method of displaying images being characterized in that it further comprises:

as long as one of said second areas displaying one of said second images is hovered over by a pointer, a display, in all or part of the first display area, of at least one part of said first image to which the at least one processing algorithm is applied to obtain said second hovered over image, the data-processing module using a data model implemented in the form of a graph whereof each state corresponds to an image and each transition between a first state corresponding to a first image and a second state corresponding to a second image illustrates an image-processing algorithm to be applied to the first image to obtain the second image, the first image displayed in the first display area corresponding to a first state of the graph so-called current state, said display step of at least one second image comprises a display step of second images relative to a current state in which, for each second image to be displayed, the data-processing module:

calculates a second image by applying, to at least one part of the image corresponding to the current state, at least one processing algorithm illustrated by at least one transition of the graph between the current state and a second state of the graph accessible from the current state; and displays the second image calculated in one of said second display areas, and in that during selection by a user of the display system of a second display area in which at least one part of an image corresponding to a second state of the graph is displayed, the processing module:

displays in the first display area an image obtained by applying, to at least one part of the image corresponding to the current state, the processing algorithms represented by the transitions between the current state and the second state, displays at least one second image in said second display areas by performing said display step of second images relative to the second state considered as new current state.

Such a method lets the user easily get an overview of the effects of the proposed processing events and compare two effects at a minimum number of operations. Such a graph easily determines which processing algorithms have been applied to a first image to obtain a second image and which images can be obtained from a current image to be processed by considering a certain number of possible processing events. This method also lets the user have a preview of the effect of processing before selecting it without having to take additional action and therefore select processing to be applied at a minimal number of operations.

The display of at least one second image on said display system can previously comprise a determination step of said second images to be displayed on said display system.

Such a step displays only the second images relative to the processing events most pertinent for the user.

By way of first example, said second images to be displayed are determined as a function of user preferences and/or from a history of the image-processing algorithms used previously.

The processing events most pertinent for the user are determined from past actions of the user so as to be well adapted to the images usually processed by the user. The user can also store a series of favorite processing events he wants to apply repeatedly to several images.

By way of second example, said second images to be displayed are determined by calculating a set of second images obtained by application to said first image of at least one image-processing algorithm and by selecting second images among the set of second calculated images as a function of the differences between these calculated images and, between these calculated images and the first image.

This proposes to the user only processing events having a clearly visible effect on the processed image or only processing events having effects which are highly differentiated, avoiding proposing to the user two processing events having similar effects.

In a first variant embodiment, said display method according to the first aspect can further comprise selection by the user of the display system of a first selection area in the first image, each second image displayed in one of said second display areas being obtained by application to the first selection area of the first image of at least one image-processing algorithm.

Such a selection lets the user define an area of particular interest of the image and display the effect of the processing algorithms proposed to this area upon displaying of the second images.

In a second variant embodiment, said display method according to the first aspect can further comprise selection by the user of the display system of a second selection area in the first display area, and the at least one processing algorithm applied to obtain the second hovered over image is applied to the first image in the second selection area of the first display area.

So the user can view the effect of several processing events each applied to a separate sub-part of the image.

Also, transformation applied to the first image by a user of the display system can also be applied to each second image displayed in one of said second display areas.

The user can best take in to account the effect of the proposed processing events on a part of the first image.

By way of first example, said transformation can comprise zooming into the first image.

This lets the user enlarge an interesting detail of the first image and take into account the effect of the proposed processing events on this detail.

By way of second example, said first image being a sub-part of an original image, said transformation can comprise translation of the sub-part of the original image displayed as first image.

This lets the user successively test the effects of the proposed processing events on different details of the original image.

According to a second aspect, the invention relates to a computer program product comprising program code instructions for executing the steps of the display method according to the first aspect when said program is executed on a computer.

According to a third aspect, the invention relates to a data-processing module configured to execute the steps of the method according to the first aspect.

According to a fourth aspect, the invention relates to a display system comprising a data-processing module according to the third aspect and at least one display system.

Such computer program product, processing module and display system have the same advantages as those mentioned for the method according to the first aspect.

PRESENTATION OF THE FIGURES

Other characteristics and advantages of the present invention will emerge from the following description of an embodiment of the invention. This description will be given in reference to the appended drawings, in which.

DETAILED DESCRIPTION

Figure 5:
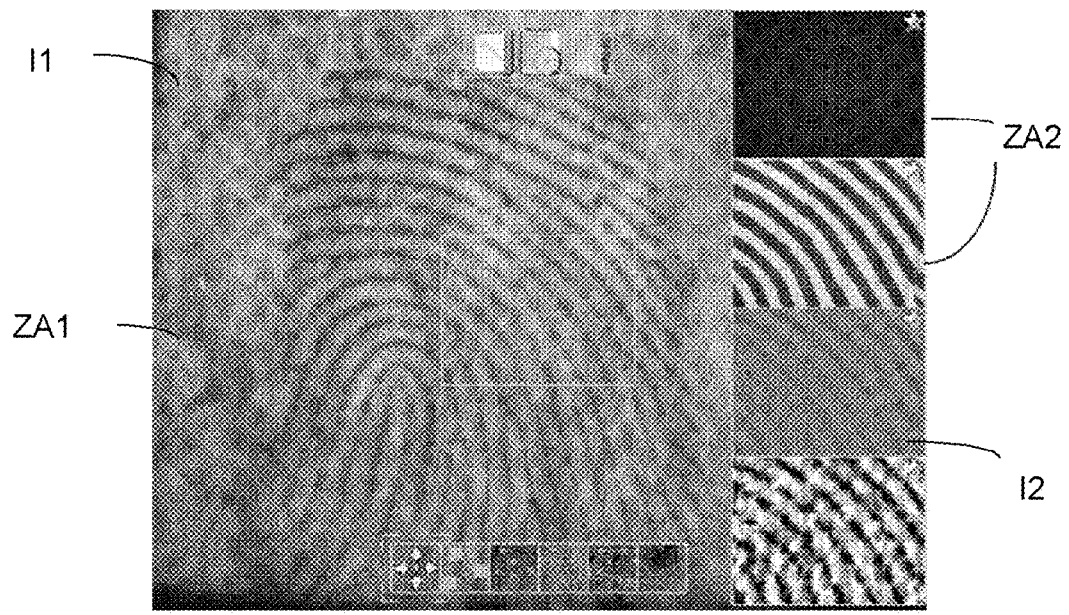
FIG. 5 illustrates the display on a display system of a first image in a first display area and several second images in second display areas according to an embodiment of the invention.

An embodiment of the invention relates to a display system comprising a data-processing module and at least one display system to which the processing module is connected. As illustrated in FIG. 5, the display system comprises at least two display areas: a first display area ZA1 and one or more second display areas ZA2.

The first area ZA1 is used to display a first image I1 which the user wants to process by one or more image-processing algorithms. In the following paragraphs the term "processing" will be used to designate application to an image of a processing algorithm or a series of processing algorithms.

According to the example illustrated in FIG. 5, the first image I1 can be for example a photograph of a fingerprint which the user wants to process to identify the characteristic points of this print, for example to compare them to a database of prints.

Each second area ZA2 can be used to propose to the user processing from a plurality of available processing events which can be applied by the processing module to the first image I1. For this, each second area ZA2 can display a second image I2 obtained by applying to at least one part of the first image a processing, i.e., a series of one or more processing algorithms.

Each second area ZA2 can also be used by the user as a control element so as to preview the result of application to the first image I1 of the processing used to obtain the second image I2 displayed in said second area ZA2, so-called processing relative to the second image, and select this processing if the result is suitable. For this, the result of application to the first image I1 of the processing relative to the second image I2 displayed in said second area ZA2 is displayed in a part of the first display area ZA1 when the user hovers over the second area ZA2 with a pointer such as a mouse pointer. This preview is maintained as long as the pointer is held on this second display area ZA2.

Figure 6:
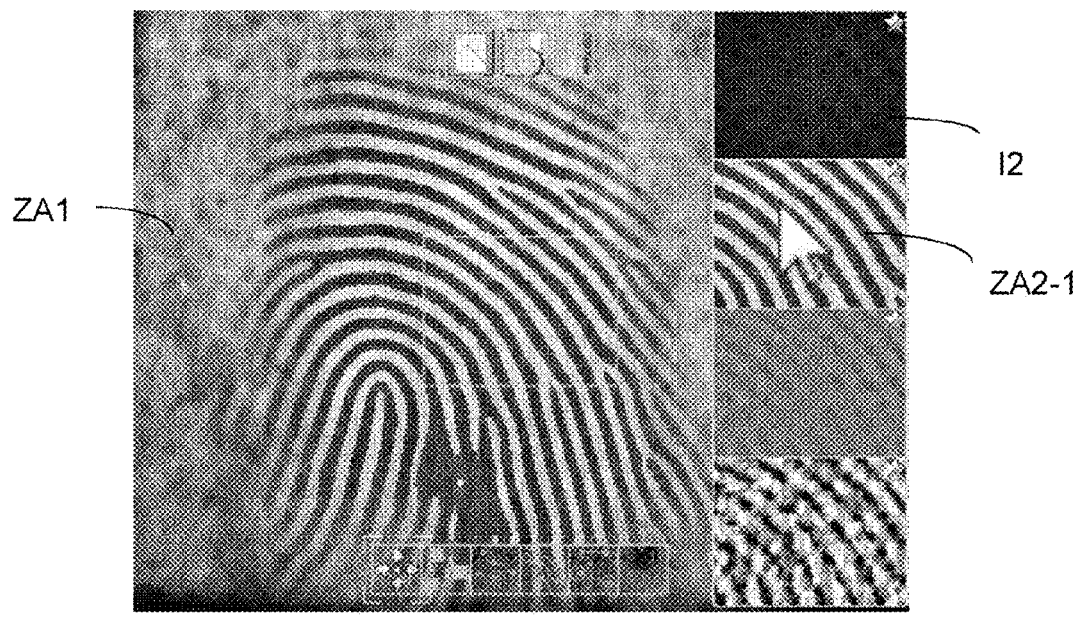
FIG. 6 illustrates the effect of hovering over one of said second display areas according to an embodiment of the invention.

By way of illustration, FIG. 6 illustrates the effect of hovering over the second display area ZA2-1. The processing relative to the second image displayed in the second area ZA2-1 is applied to the first display area ZA1.

If the user wants to preview the result of other image processing, all he has to do is slide the pointer onto another second display area. The processing relative to the second image displayed in this other second display area will be applied to the first display area ZA1. The user can very easily preview the effect of different processing events without having to perform many operations to move from one processing to another. Shifting the pointer from a second display area to another directly replaces one preview by another without returning via a display of the first non-modified image I1. It is also much easier for the user to compare the effect of processing to that of another and to select the best adapted processing.

Figure 7:
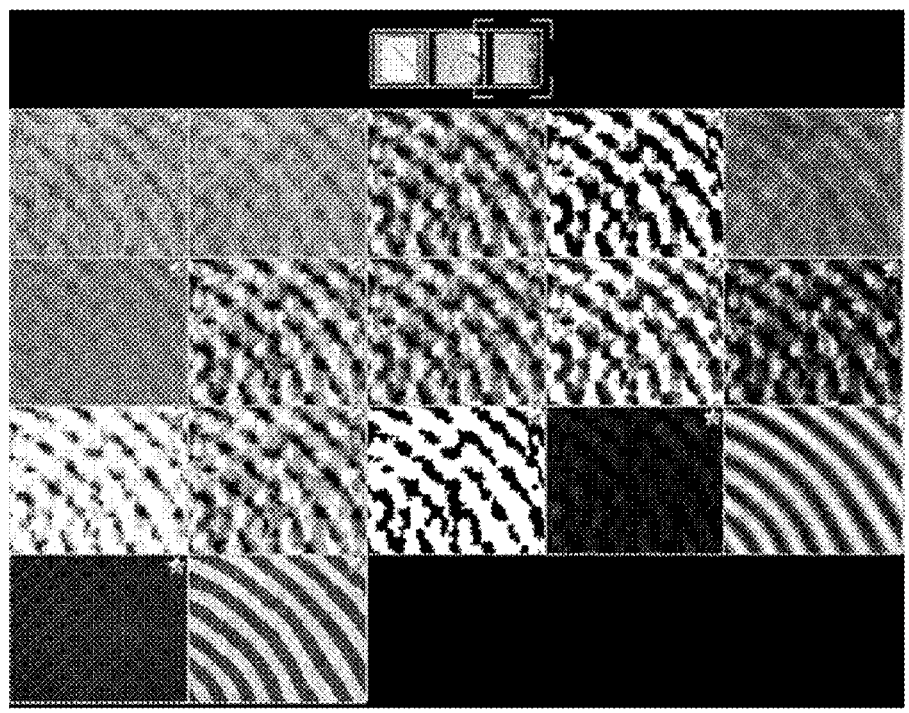
FIG. 7 illustrates another example of scheduling of the second images on the display system according to an embodiment of the invention.

In an embodiment illustrated in FIG. 7 the processing module can display on the display system only second display areas so as to display a larger number of second images and propose to the user a larger number of processing events. The first image is no longer displayed temporarily on the display system.

When the user has determined the processing he wants to apply permanently to the first image I1, the corresponding second display area can be used as a control element to apply this processing to the first image I1. To select processing, the user can for example click the pointer on the corresponding second display area.

Figure 1:
FIG. 1 illustrates the display of an image to be processed.
Figure 2:
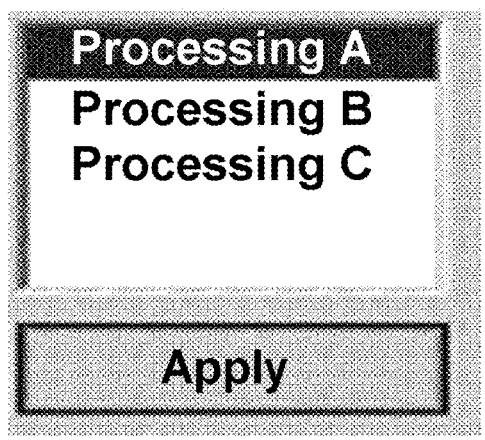
FIG. 2 illustrates a list for selecting processing to be applied to the image displayed in FIG. 1 as per the prior art.
Figure 3:
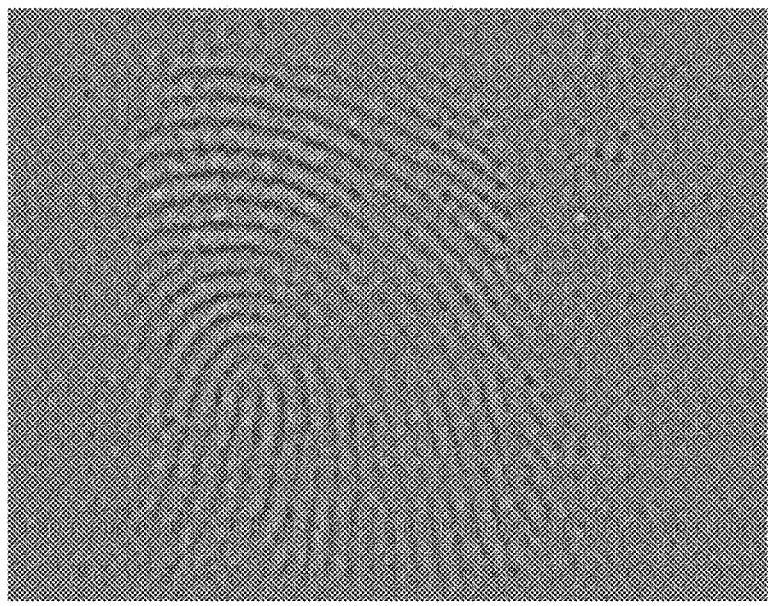
FIG. 3 illustrates the display of the processed image generated by applying a first processing selected in FIG. 2 to the image to be processed displayed in FIG. 1.
Figure 4:
FIG. 4 illustrates the display of the processed image generated by applying a second processing selected in FIG. 2 to the image to be processed displayed in FIG. 1.

By way of illustration, FIG. 4 illustrates the effect of selecting the second display area ZA2-1 of FIG. 6. The processing algorithm relative to the second image displayed in the second area ZA2-1 is applied permanently to the first display area ZA1.

Figure 8:
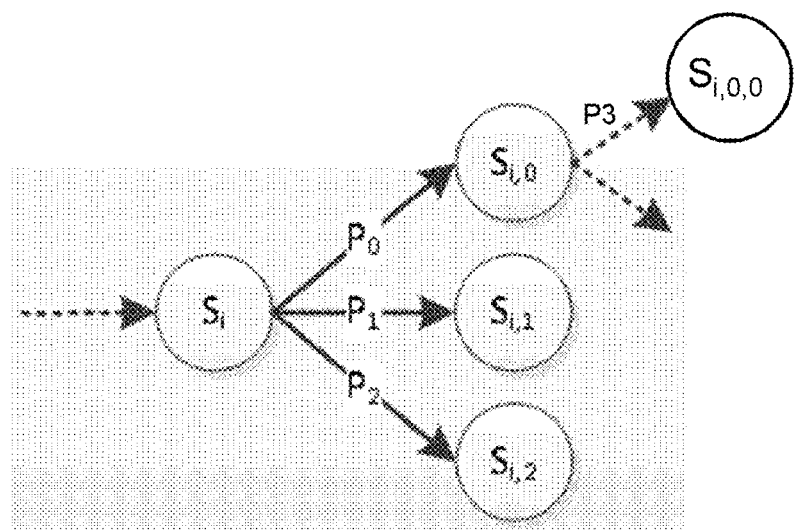
FIG. 8 illustrates a graph used for implementing the method according to the invention.

To perform such a display, the processing module uses a data model implemented in the form of a graph whereof each state corresponds to an image and each transition between a first state corresponding to a first image and a second state corresponding to a second image illustrates an image-processing algorithm to be applied to the first image to obtain the second image, as illustrated in FIG. 8.

The state of the graph corresponding to a first image I1 displayed in the first display area ZA1 is called current state. By way of example this state is called state Si in FIG. 8. From this current state the processing module can calculate each image obtained by application of processing. For example, the image associated with the state $S_{i,1}$ is calculated by applying to the first image associated with the current state Si the processing algorithm associated with the transition P1. Similarly, the image associated with the state $S_{i,0,0}$ can be calculated by applying to the first image associated with the current state Si the appropriate processing, i.e., by applying successively the processing algorithm associated with the transition P0 then that associated with the transition P3. In this way the set of child states of the current state illustrates the set of images which can be obtained by application of processing, corresponding to a series of one or more processing algorithms, to the first image associated with the current state Si. Each second display area ZA2 is used to display all or part of an image corresponding to an child state of the current state.

When the user selects a second display area, i.e., the processing relative to the second image displayed in this display area, for example by clicking on this second display area, this processing is applied to the first image. This processing corresponds to one or more transitions in the graph leading from the current state to that of its child states corresponding to the image, so-called selected image, whereof at least one part is displayed in the second selected area. Once the user selects the processing, the selected image corresponding to this child state is displayed at least in part in the first display area and this child state becomes the current state.

The transitions of the graph can be bidirectional, i.e., travelled in both directions. It is possible to navigate backwards in the graph, i.e., cancel application of a processing algorithm to an image corresponding to a given state to recover the image corresponding to the parent state of this state. For example, starting with the image associated with the state $S_{i,0}$, the processing algorithm can cancel the application of the algorithm P0 to recover the image associated with the state $S_i$.

Figure 9:
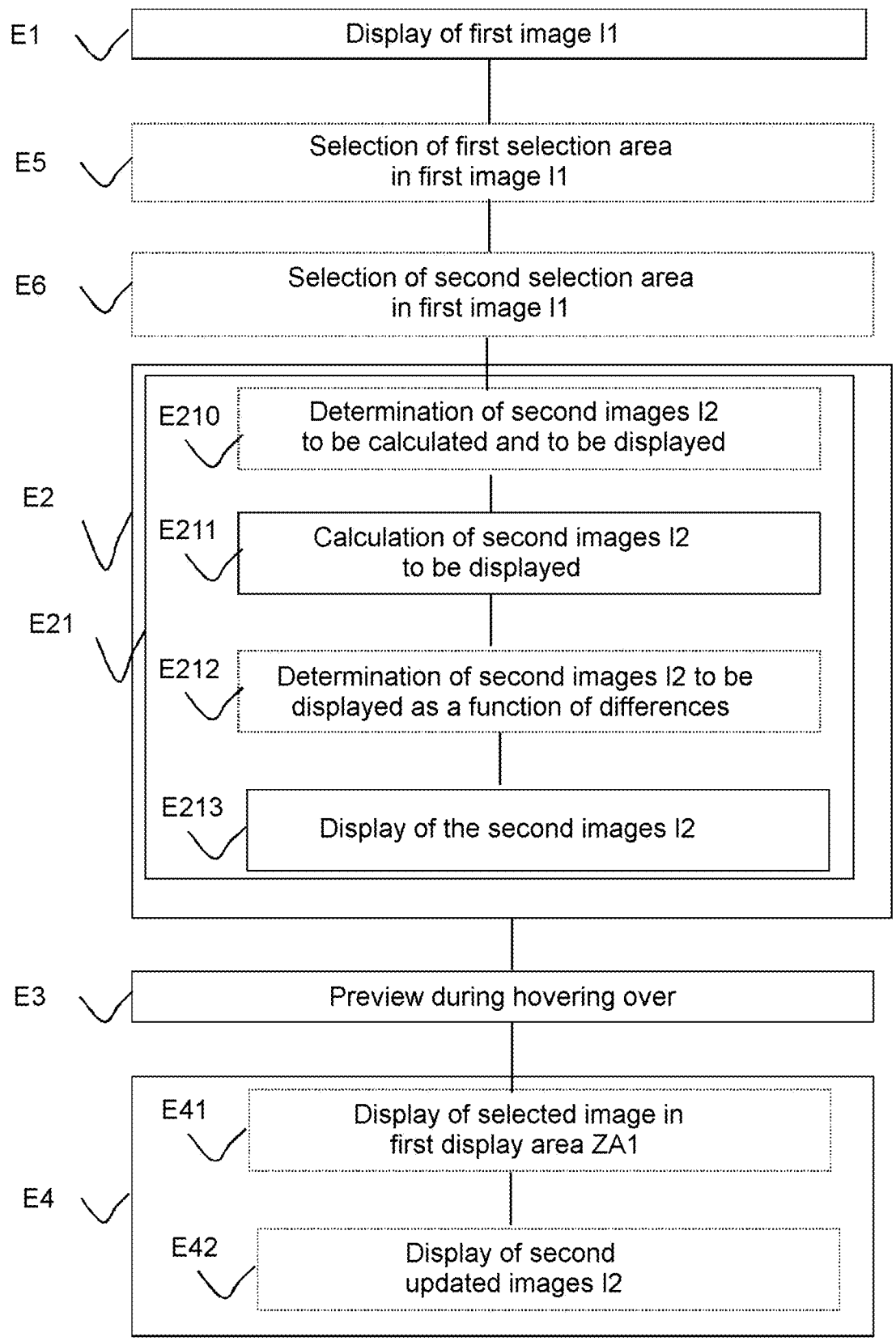
FIG. 9 is a diagram showing an implementation of a method of displaying images according to the invention.

In reference to FIG. 9, an embodiment of the invention relates to a method of displaying images executed by the data-processing module comprising the steps described in the following paragraphs.

During a first display step E1, a first image I1 is displayed in the first display area ZA1.

During a second display step E2, at least one second image I2 obtained by application to at least one part of the first image I1 of image processing is displayed, each second image I2 being displayed in a second display area ZA2.

Each of these images corresponds to a state of the graph or is a part of an image corresponding to a state of the graph.

During a preview step E3, as long as one of said second areas ZA2 displaying one of said second images I2 is hovered over by a pointer, the processing module displays, in all or part of the first display area ZA1, at least one part of the first image I1 to which the processing relative to the second image is applied.

The user displays the effect on at least one part of the first image of the processing relative to the second image which the user has chosen to hover over.

The second display step of at least one second image E2 can comprise a display step of second images relative to a current state E21. During this step, for each second image to be displayed the processing module performs a calculation step E211 of the second image to be displayed by applying, to at least one part of the image I1 corresponding to the current state, the processing algorithm(s) represented by the transitions of the graph between the current state and a second state of the graph accessible from the current state. The processing module calculates the image associated with this second state, child of the current state.

The processing module can then display during a third display step E213 each second image calculated in one of the second display areas ZA2.

In a first embodiment, prior to the calculation step 211 during a first determination step E210 the processing module can determine the second images to be calculated and to be displayed. According to a first variant, the second images to be calculated and to be displayed are determined as a function of preferences of the user. The user can have indicated previously which image-processing events he wants to see proposed as a priority. The user can also have registered one or more favorite processing events each corresponding to a series of transitions in the graph having a particular interest for the user. To define such a favorite processing, during a previous implementation of the method according to the invention, the user selects a processing or a series of processing events for an image and requires storing in memory of this processing or this series of processing events in the form of a favorite processing. The processing module then registers the series of transitions travelled in the graph from a state of departure corresponding to an original image. During the later implementations of the method on other images, the processing module displays in a second display area a second image obtained by application to the first image of the favorite stored processing. This lets a user repeatedly apply to several images to be processed the same series of processing events without having to each time select the processing events of this series one by one. According to a second variant, the second images to be calculated and to be displayed are determined automatically from a history of image-processing events used previously, for example by the user on other images during previous implementations of the display method according to the invention.

In a second embodiment, the processing module can calculate more second images than the number of second display areas ZA2 and then determine which images among these calculated images must be displayed in the second display areas ZA2. The processing module can for example calculate a set of second images obtained by application to the first image of a predefined set of processing events, or even all the processing events known from the processing module. The processing module can then select second images to be displayed in the second display areas among the second calculated images during a second determination step E212 as a function of the differences between these calculated images and between these calculated images and the first image. For example the processing module can select the second images having the greatest difference relative to the first image and/or having the most differences between them. The processing events proposed to the user each have a highly visible effect and/or one quite different to those of the other proposed processing events, avoiding proposing to the user several processing events with similar results.

Also, transformation applied to the first image by the user of the display system can also be applied to each second image displayed in one of said second display areas.

The user can for example decide to zoom in the first image to display in the first display area an enlargement of a sub-part of the first image, for example a sub-part comprising a face, a fingerprint or a particular detail of such elements. The zoom applied by the user is then also applied to each second image displayed in the second display areas.

If the first image displayed in the first display area is a sub-part of a larger original image, the user can also control a translation of the sub-part of the original image displayed as first image, i.e., shift the first display area in the original image. The same translation is then applied to each second image displayed in a second display area. Each second image is recalculated by applying the processing relative to this second image to at least one part of the new sub-part of the original image displayed in the first display area.

During a first selection step E4, the user selects a second display area in which at least one part of an image is displayed, said selected image, corresponding to a second state of the graph, child of the current state, for example by clicking on the second display area selected.

During a fourth display step E41, the processing module displays in the first display area the selected image, obtained by applying to at least one part of the image corresponding to the current state, i.e., of the first image I1, the processing relative to the second image displayed in the second area selected, i.e., the processing algorithm(s) represented by the transitions between the current state and the second state corresponding to the selected image. The processing selected in this way by the user is applied to the first image. The state corresponding to the selected image then becomes the new current state.

During a fifth display step E42, the processing module displays at least one second image in one of said second display areas by performing the display step of second images relative to the second state considered as new current state E21. The second display areas are updated relative to this new current state to propose to the user new image-processing events to be applied to the processed image displayed in the first display area ZA1.

According to an embodiment, during a second selection step E5 the user can select in the first image a first selection area defining the area of the first image displayed, after application of processing, in each second display area. Each second image displayed in one of said second display areas during the second display step E2 is obtained by application to the first selection area of the first image of image processing. An example of such an embodiment is illustrated in FIG. 5 on which each second display area ZA2 displays a second image obtained by the application of processing to the sub-area ZA1-1 of the first image I1. The user can select a particular area of interest of the first image to be displayed in the second display areas to make selection of image processing easier.

According to another embodiment, during a third selection step E6, the user can select in the first image a second selection area defining a display area to which image processing is applied when the user hovers over a second display area or selects processing. The processing selected or relative to the second hovered over image is applied respectively during the first selection step E4 or during the preview step E3 to the first image in the second selection area of the first display area. This lets the user accelerate the preview of the display by the processing module by asking him to apply the processing algorithm only to an area of interest of the first image.

According to a variant embodiment, calculation of the second images and those images which can be obtained by application of processing to all or part of the first image is performed as a background task without waiting for the user to hover over a second display area or select processing. In this way, the images to be displayed following action of the user are at least in part calculated before the user takes this action and display on the screen of these new images is accelerated.

Such a solution lets the user easily compare different processing algorithms, preview the result of their application to an image to be processed, select one or more processing events in a limited number of operations and apply them to a series of images to be processed.

The invention claimed is:
1. A method of displaying images executed by a data-processing module capable of being connected to a display system comprising at least two display areas,
said method of displaying images comprising the following steps:
displaying a first image in a first display area of said display system,
displaying at least one second image obtained by application to the first image of at least one image-processing algorithm, each second image being displayed in a second area of said display system, said method of displaying images being characterized in that it further comprises:

as long as one of said second areas displaying one of said second images is hovered over by a pointer, displaying, in all or part of the first display area, at least one part of said first image to which the at least one processing algorithm is applied to obtain said second hovered over image, the data-processing module using a data model implemented in the form of a graph whereof each state corresponds to an image and each transition between a first state corresponding to a first image and a second state corresponding to a second image illustrates an image-processing algorithm to be applied to the first image to obtain the second image, the first image displayed in the first display area corresponding to a first state of the graph so-called current state, said step of displaying at least one second image comprises displaying second images relative to a current state in which, for each second image to be displayed, the data-processing module:

calculating a second image by applying, to at least one part of the image corresponding to the current state, at least one processing algorithm illustrated by at least one transition of the graph between the current state and a second state of the graph accessible from the current state; and displaying the second image calculated in one of said second display areas, and wherein during selection by a user of the display system of a second display area in which at least one part of an image corresponding to a second state of the graph is displayed, to apply the processing relative to the second image displayed in the second display area, the processing module:

displaying in the first display area an image obtained by applying, to at least one part of the image corresponding to the current state, the processing algorithms represented by the transitions between the current state and the second state, displaying at least one second image in said second display areas by performing said display step of second images relative to the second state considered as new current state to update the second display areas relatively to this new current state to display new image-processing events to be applied to the image obtained displayed in the first display area.

2. The display method according to claim 1, wherein displaying at least one second image on said display system, previously comprises determining step said second images to be displayed on said display system.

3. The display method according to claim 1, wherein said second images to be displayed are determined as a function of user preferences and/or from a history of the image-processing algorithms used previously.

4. The display method according to claim 2, wherein said second images to be displayed are determined by calculating a set of second images obtained by application to said first image of at least one image-processing algorithm and by selecting second images among the set of second calculated images as a function of the differences between these calculated images and, between these calculated images and the first image.

5. The display method according to claim 1, further comprising selecting by the user of the display system a first selection area in the first image, wherein each second image displayed in one of said second display areas is obtained by application to the first selection area of the first image of at least one image-processing algorithm.

6. The display method according to claim 1, further comprising selecting by the user of the display system a second selection area in the first display area, and wherein the at least one processing algorithm applied to obtain the second hovered over image is applied to the first image in the second selection area of the first display area.

7. The display method according to claim 1, wherein a transformation applied to the first image by a user of the display system is also applied to each second image displayed in one of said second display areas.

8. The display method according to claim 7, wherein said transformation comprises a zoom in the first image.

9. The display method according to claim 7, wherein with said first image being a sub-part of an original image, said transformation comprises translation of the sub-part of the original image displayed as first image.

10. A computer program product comprising program code instructions for executing steps of the display method according to claim 1 when said program is executed on a computer.

11. A data-processing module configured to execute the steps of the method according to claim 1.

12. A display system comprising a data-processing module according to claim 11 and at least one display system.

* * * * *